US007096502B1

(12) United States Patent
Fox et al.

(10) Patent No.: US 7,096,502 B1
(45) Date of Patent: *Aug. 22, 2006

(54) SYSTEM AND METHOD FOR ASSESSING THE SECURITY POSTURE OF A NETWORK

(75) Inventors: Kevin L. Fox, Palm Bay, FL (US); Ronda R. Henning, West Melbourne, FL (US); John T. Farrell, Melbourne, FL (US); Clifford C. Miller, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,108

(22) Filed: Feb. 8, 2000

(51) Int. Cl.
*G06F 11/34* (2006.01)
*G06F 11/00* (2006.01)
*G06F 15/173* (2006.01)
*G06F 17/30* (2006.01)
*G06G 17/00* (2006.01)
*G06F 17/00* (2006.01)

(52) U.S. Cl. .......................... 726/25; 714/37; 709/224; 707/8; 707/103

(58) Field of Classification Search ................ 709/224; 714/37; 713/201; 726/25; 707/103, 8, 45
See application file for complete search history.

(56) References Cited

U.S. PATENT DOCUMENTS

| 5,138,321 | A | | 8/1992 | Hammer ...................... 342/36 |
| 5,485,409 | A | | 1/1996 | Gupta et al. ................. 395/186 |
| 5,528,516 | A | * | 6/1996 | Yemini et al. ............... 702/181 |
| 5,684,957 | A | | 11/1997 | Kondo et al. .......... 395/200.06 |
| 5,699,403 | A | * | 12/1997 | Ronnen .................... 379/15.04 |
| 5,745,382 | A | | 4/1998 | Vilim et al. ........... 364/551.01 |
| 5,751,965 | A | * | 5/1998 | Mayo et al. ................. 709/224 |
| 5,787,235 | A | * | 7/1998 | Smith et al. .................. 706/47 |
| 5,798,939 | A | | 8/1998 | Ochoa et al. ............... 364/493 |
| 5,812,763 | A | | 9/1998 | Teng ..................... 395/187.01 |
| 5,892,903 | A | * | 4/1999 | Klaus ......................... 713/201 |
| 5,963,653 | A | | 10/1999 | McNary et al. ............. 382/103 |
| 6,020,889 | A | * | 2/2000 | Tarbox et al. .............. 715/736 |
| 6,054,987 | A | * | 4/2000 | Richardson ................ 715/734 |
| 6,269,447 | B1 | * | 7/2001 | Maloney et al. ............. 726/25 |
| 6,282,546 | B1 | * | 8/2001 | Gleichauf et al. .......... 707/102 |

(Continued)

FOREIGN PATENT DOCUMENTS

EP 0 961 440 A2 12/1999

(Continued)

OTHER PUBLICATIONS

Henning et al., "The Network Vulnerability Tool (NVT)—A System Vulnerability Visualization Architecture," U.S. Government Publication Release Authority, Oct. 18, 1999, pp. 98-111.

*Primary Examiner*—Ayaz Sheikh
*Assistant Examiner*—Kaveh Abrishamkar
(74) *Attorney, Agent, or Firm*—Allen, Dyer, Doppelt, Milbrath & Gilchrist, P.A.

(57) ABSTRACT

A method and data processing system assesses the security vulnerability of a network by creating a system object model database representing a network. The system object model database supports the information data requirements of disparate network vulnerability analysis programs. The system object model database is exported to the disparate network vulnerability analysis programs. The network is analyzed with each network vulnerability analysis program to produce data results from each program. Data results are correlated to determine the security posture of the network.

36 Claims, 14 Drawing Sheets

U.S. PATENT DOCUMENTS

| | | | |
|---|---|---|---|
| 6,298,445 B1 * | 10/2001 | Shostack et al. | 726/25 |
| 6,301,668 B1 * | 10/2001 | Gleichauf et al. | 713/201 |
| 6,324,656 B1 * | 11/2001 | Gleichauf et al. | 714/37 |
| 6,415,321 B1 * | 7/2002 | Gleichauf et al. | 709/224 |
| 6,499,107 B1 * | 12/2002 | Gleichauf et al. | 713/201 |
| 6,883,101 B1 * | 4/2005 | Fox et al. | 726/25 |
| 6,889,168 B1 * | 5/2005 | Hartley et al. | 702/186 |

FOREIGN PATENT DOCUMENTS

| | | |
|---|---|---|
| WO | 99/56195 | 11/1999 |
| WO | WO 99/56195 | 11/1999 |

* cited by examiner

SYSTEM CLASS DIAGRAM

SYSTEM AND METHOD FOR ASSESSING THE SECURITY POSTURE OF A NETWORK

This invention was made with Government support under Contract No. F30602-96-C-0289 awarded by the United States Air Force. The Government has certain rights in this invention.

FIELD OF THE INVENTION

This invention relates to the field of networks, and more particularly, this invention relates to the field of assessing the security posture of networks.

BACKGROUND OF THE INVENTION

Information systems and computer network infrastructures currently under development are now being built with consideration for what constitutes an acceptable risk (or adequate protection). System assets, such as the hardware, software and system nodes of a computer network, must be protected to a degree consistent with their value. Additionally, these assets must be protected only until the assets lose their value. Any security features and system architecture should also provide sufficient protection over the life of the processed data. To assess whether or not any risk associated with a network is acceptable, a security engineer typically gathers all pertinent information, and then analyzes the risk associated with the network.

Risk analysis is a complex and time consuming process, which is necessary to determine the exposures within a network and their potential harm. As an example, when analyzing the security risks in a computer network, the security engineering typically follows the following steps:

1) Identify assets of the overall computing system.
2) Identify vulnerabilities of assets. This step typically requires imagination in order to predict what damage might occur to the assets and from what sources. The three basic goals of computer security are ensuring secrecy, integrity and availability. A vulnerability is any situation that could cause loss of one of those three qualities.
3) Predict likelihood of occurrence (exploitation), i.e., determining how often each exposure will be exploited. Likelihood of occurrence relates to the stringency of the existing controls and the likelihood that someone or something will evade the existing controls.
4) Compute any uncovered cost per year (expected annual loss) by determining the expected cost of each incident.
5) Survey applicable controls and their costs.
6) Project annual savings of control.

This last step of the analysis is a cost-benefit analysis, i.e., does it cost less to implement a control or to accept the expected cost of the loss? Risk analysis leads to a security plan, which identifies responsibility for certain actions to improve security.

Today, the rapid evolution of technology and proliferation of computers with increased power mandate the use of commercial-off-the-shelf (COTS) hardware and software components for cost effective solutions. This strong dependence on COTS implies that commercial grade security mechanisms are sufficient for most applications. Security architectures, therefore, must be structured to build operational, mission-critical computer systems with relatively weak COTS components. Higher assurance components can be placed at community or information boundaries, forming an enclave-based security architecture that implements a defense-in-depth approach to information assurance.

There are some design tools, i.e., software programs, available to the system architect to assist in maximizing the available protection mechanisms while remaining within the development budget. Current generation risk analysis tools usually are single vendor solutions that address a particular aspect or aspects of risk. These tools tend to fall into one of three categories:

1) Tools that work from documented vulnerability databases and possibly repair known vulnerabilities. Tools of this type are vendor-dependent for database updates, either through new product versions or by a subscription service. Examples from this category include ISS' Internet Scanner, Network Associates, Inc.'s CyberCop and Harris' STAT.

2) Monolithic tools that use various parameters to calculate a risk indicator. These tools are difficult to maintain and hard to keep current with the rapidly evolving threat and technology environment. An example of this tool category is Los Alamos Vulnerability Assessment (LAVA) tool.

3) Tools that examine a particular aspect of the system, such as the operating system or database management system, but ignore the other system components. SATAN, for example, analyzes operating system vulnerabilities, but ignores infrastructure components such as routers.

The use of multiple tools from a variety of vendors for a single computer network analysis is a labor-intensive task. Typically, a security engineer will have to enter a description or representation of the system (network) multiple times in multiple formats. The security engineer then must manually analyze, consolidate and merge the resulting outputs from these multiple tools into a single report of a network's security posture. Afterwards, the security engineer can complete the risk analysis (calculating expected annual loss, surveying controls, etc.), and then repeat the process to analyze alternatives among security risks, system performance, mission functionality and the development budget.

Also, none of these tools use an aggregate "snapshot" approach to the system with a "drill down" or layered approach to facilitate how one addresses risk at various layers (network, platform, database, etc.) of the system. These tools provide little assistance to system designers when analyzing alternatives among security risk, system performance and mission functionality. Instead, a "risk solution" is provided that addresses the particular aspect of risk that a given tool was designed to calculate. To develop a comprehensive risk assessment, a security engineer would have to become proficient in the use of several tools and manually correlate the resulting outputs.

One aspect of successful risk analysis is a complete and accurate accumulation of data to generate system models used by the analysis tools. Many current risk analysis tools depend on surveys filled out by users, system operations personnel, and analysts to acquire the data for development of a system model used in the analysis. Alternatively, a tool can actively scan a computer network to test various vulnerabilities against system components.

However, these methods have drawbacks. Textual or survey-based knowledge solicitation techniques are labor intensive and potentially tedious for the analyst. Many of the existing tools reuse the same information to analyze different aspects of the system security. It would be more advantageous to use a centralized repository of modeling data, which could provide a basis for shared inputs among existing tools. This repository could be used to generate data sets for use by risk analysis tools, allowing multiple tools to be run against the same system without separate input activities, thus reducing the possibility of operator error. The use of multiple risk analysis reasoning engines, or backbends, would allow various aspects of the system to be analyzed without the cost of developing one tool to perform all types of analysis. Integration of the information and the resulting informed assessments available by applying multiple tools would produce a more robust and accurate picture of a system's security posture. These results can facilitate more informed system design decisions, providing a framework for alternative evaluation and comparison.

SUMMARY OF THE INVENTION

It is therefore an object of the present invention to provide a data processing system and method for assessing the security posture of a network without having to analyze the network a multiple number of times.

In accordance with the present invention, a method and data processing system assesses the security posture of a network. The method comprises the steps of creating a system object model database representing a network. The system object model database supports the information data requirements of disparate network vulnerability assessment/ risk analysis programs. This system object model database is imported to the disparate network vulnerability analysis programs. The network is analyzed with each network vulnerability/risk analysis program to produce data results from each program. These data results are correlated to determine the security posture of the network.

In still another aspect of the present invention, the method comprises the step of exporting the system object model database to the network vulnerability analysis programs via an integrated application programming interface. The method also comprises the step of modeling the network as a map on a graphical user interface. A class hierarchy is established to define components of the network vulnerability analysis programs and share common data and programming traits. The data results of the network vulnerability analysis programs use fuzzy logic processing for correlating the data results in still another aspect of the present invention.

The method can also comprise the step of running the network vulnerability analysis programs to obtain data results pertaining to network system details, network topologies, node level vulnerabilities and network level vulnerabilities.

In still another aspect of the present invention, a computer program resides on a medium that can be read by a program. This computer program comprises instructions to cause a computer to create a system object model database representing a network, wherein the system object model database supports the information data requirements of network vulnerability/risk analysis programs that analyze discrete network portions. The computer program also has instructions to import the system object model database of the network to the network vulnerability analysis programs and analyze the network with each network vulnerability analysis program to produce data results from each program. The computer program also causes a computer to correlate the data results of the network vulnerability analysis programs to determine the security posture of the network.

In still another aspect of the present invention, the computer program comprises instructions for displaying an integrated application programming interface and importing the system object model database to the network vulnerability analysis programs via the integrated application programming interface.

The computer program also includes instructions for modeling the network as a map on a graphical user interface and establishing a class hierarchy to define components of the network vulnerability analysis programs that share common data and programming traits. The computer program can also comprise instructions for correlating the data results of the network vulnerability analysis programs used in fuzzy logic processing and obtain data results that pertain to network system details, network topologies, node level vulnerabilities and network level vulnerabilities.

In still another aspect of the present invention, a data processing system assesses the security posture of a network and comprises a plurality of disparate network vulnerability analysis programs used for analyzing a network. A system object model database represents the network to be analyzed and supports the information data requirements of the network vulnerability assessment/risk analysis programs. An applications programming interface imports the system object model database of the network to the network vulnerability analysis programs. A processor correlates the data results obtained from each network vulnerability analysis program after analyzing the network to determine the security posture of the network.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
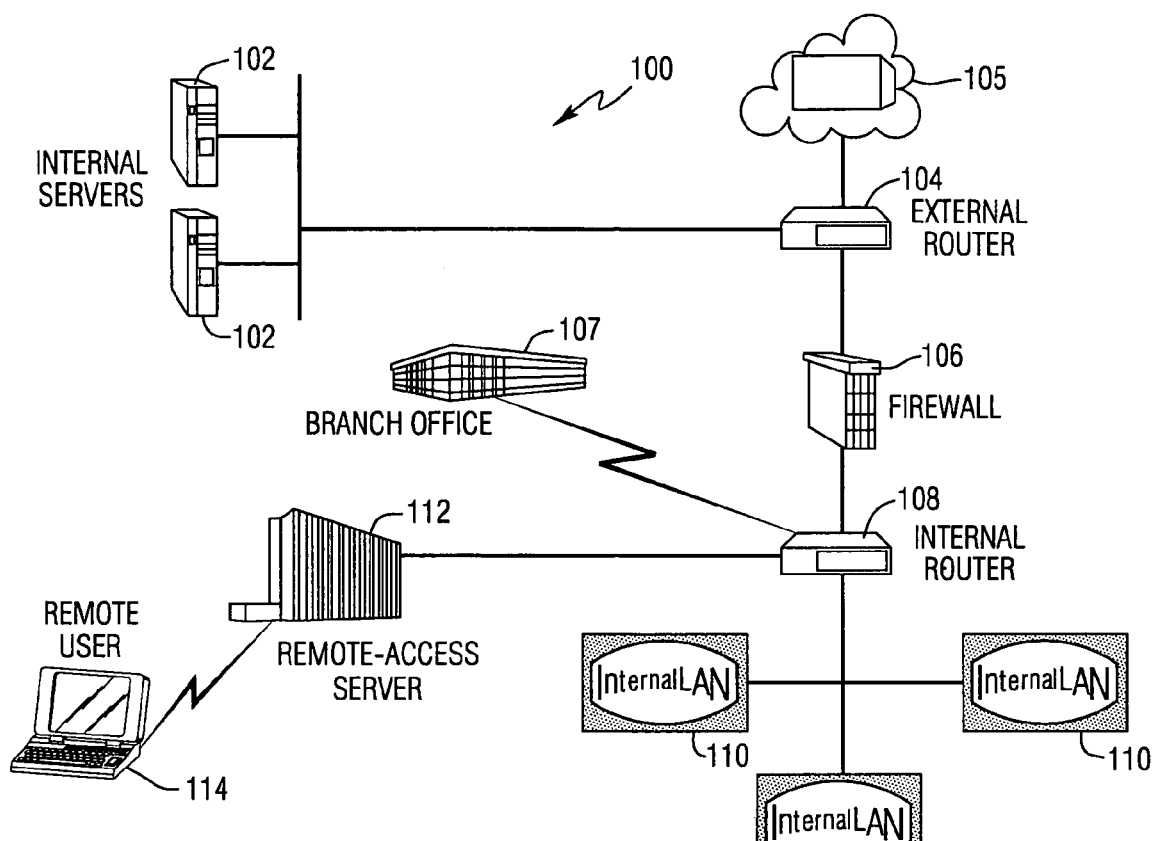
FIG. 1 is a schematic block diagram of a network showing locations where frequent problems are found on networks.

FIG. 1 illustrates an example of a conventional network 100 having internal servers 102 that connect to an external router 104, communication network 105, and firewall 106. An internal router 108 is connected to the firewall 106, branch office 107, and connected to internal LAN network components 110 and a remote-access server 112 and remote user 114.

Using the example of FIG. 1, frequent problems found on networks include hosts, such as the internal servers 102, which run unnecessary services, for example, a denial of service and anonymous FTP or misconfigured web servers that could be an internal server, for example, CGI scripts, anonymous FTP and SMTP. The internal LAN's 110 could include unpatched, outdated, vulnerable or default configured software and firmware and weak passwords. LAN's could also include improperly exported file sharing services, such as NetWare file services and NetBIOS. The internal LAN 110 could also include misconfigured or unpatched windows NT servers and problems caused by a lack of comprehensive policies, procedures, standards and guidelines. A remote-access server 112 could have unsecured remote-access points and the external router 104 could have information leakage through services, such as SNMP, SMIP, finger, roosers, SYSTAT, NETSTAT, TELNET banners, Windows NT TCP 139 SMB (server message block), and zone transfers to non-named server hosts. It could also have inadequate logging, monitoring and detecting capabilities. The branch office 107 could have a misappropriated trust relationship such as RLOGIN, RSH, or REXEC. The firewall 106 could be misconfigured or have a misconfigured router access control list.

Although these network problems are only an example of common problems found on networks 100, there are many other problems that could occur, as is well known to those skilled in the art.

Figure 2:
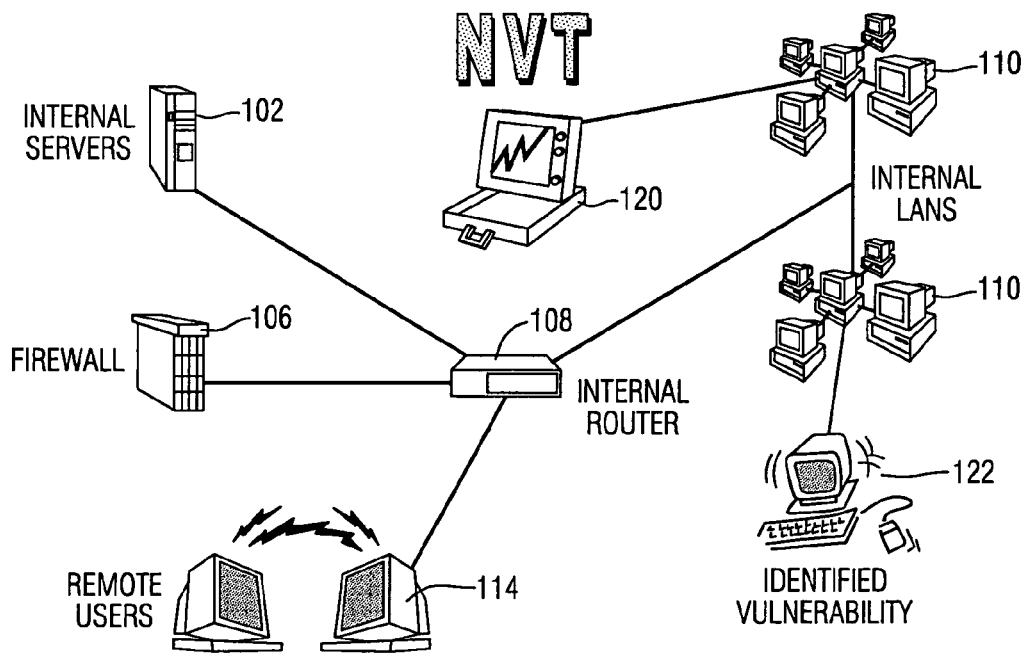
FIG. 2 is another schematic block diagram of a network showing an identified vulnerability located by the system and method of the present invention.

The present invention is advantageous because the system and method of the present invention allows the vulnerabilities of a network system to be identified. The software of the data processing system and method can be located on a user terminal 120, as shown in FIG. 2, showing an identified vulnerability of a node 112 connected in the internal LAN 110. For purposes of description, the data processing system and method of the present invention can be referred to as a Network Vulnerability Tool (NVT), i.e., a tool a user uses to determine network vulnerabilities and risks.

The data processing system forming the NVT of the present invention can be loaded on a Pentium PC platform running Windows NT. This type of platform can provide a low cost solution and support a large variety of assessment tools, also commonly referred to as network vulnerability assessment or risk analysis programs throughout this description. These network vulnerability analysis programs typically are the standard COTS/GOTS programs known by security engineers, and include HP Open View, which allows network automatic discovery or manual network modeling; ANSSR (Analysis of Network System Security Risks) as manufactured by Mitre Corporation, a GOTS network system analysis tool, which allows passive data gathering and single occurrence of loss. NSA's risk assessment methodology known as RAM (risk assessment model) can also be used and is implemented in the DPL-f decision support programming language. RAM also allows passive data gathering for event tree logic, prioritizes the task list, and allows a mathematical model with multiple risks/services. It is event based over time.

DPL (decision programming language) is a decision support software package that facilitates the modeling of complex decisions. It allows a user to incorporate uncertainty and flexibility into a decision process. DPL provides a graphical interface for building a model, and performs analyses on the model. DPL-f contains the functionality built into DPL and provides a graphic interface for fault tree construction. This feature allows the modeler to create fault trees and incorporate them into DPL models. DPL-f also contains unique analytic tools. These tools include the ability to calculate explicitly the probability of any event in the tree and perform fault tree-specific types of sensitivity analysis. DPL-f provides an interface for incorporating time series into a model. This allows a modeler to account for devaluation, capital growth or other time-bearing quantities without changing the structure of the model. DPL-f provides RAM with additional capabilities for rapid fault tree construction, libraries of embedded fault trees, an expert opinion generation system, enumeration and ordering of cut sets and a graphical portrayal of risk over time.

The ISS Internet scanner as developed by Internet Security Systems Corporation (ISS) allows active data gathering and scans a network for hosts, servers, firewalls and routers and assesses security and policy compliance with networks, operating systems and software applications. It allows a snapshot in time and a computer network compliance report. These programs are disparate network vulnerability analysis programs that the NVT of the present invention allows for integration.

The NVT of the present invention is based on a knowledge solicitation framework, which incorporates a graphical description of a network topology. This topology is used to capture network attributes and analyzed subsequently for security vulnerabilities. Graphical user interface is also used to improve accuracy of the network model.

Figure 7:
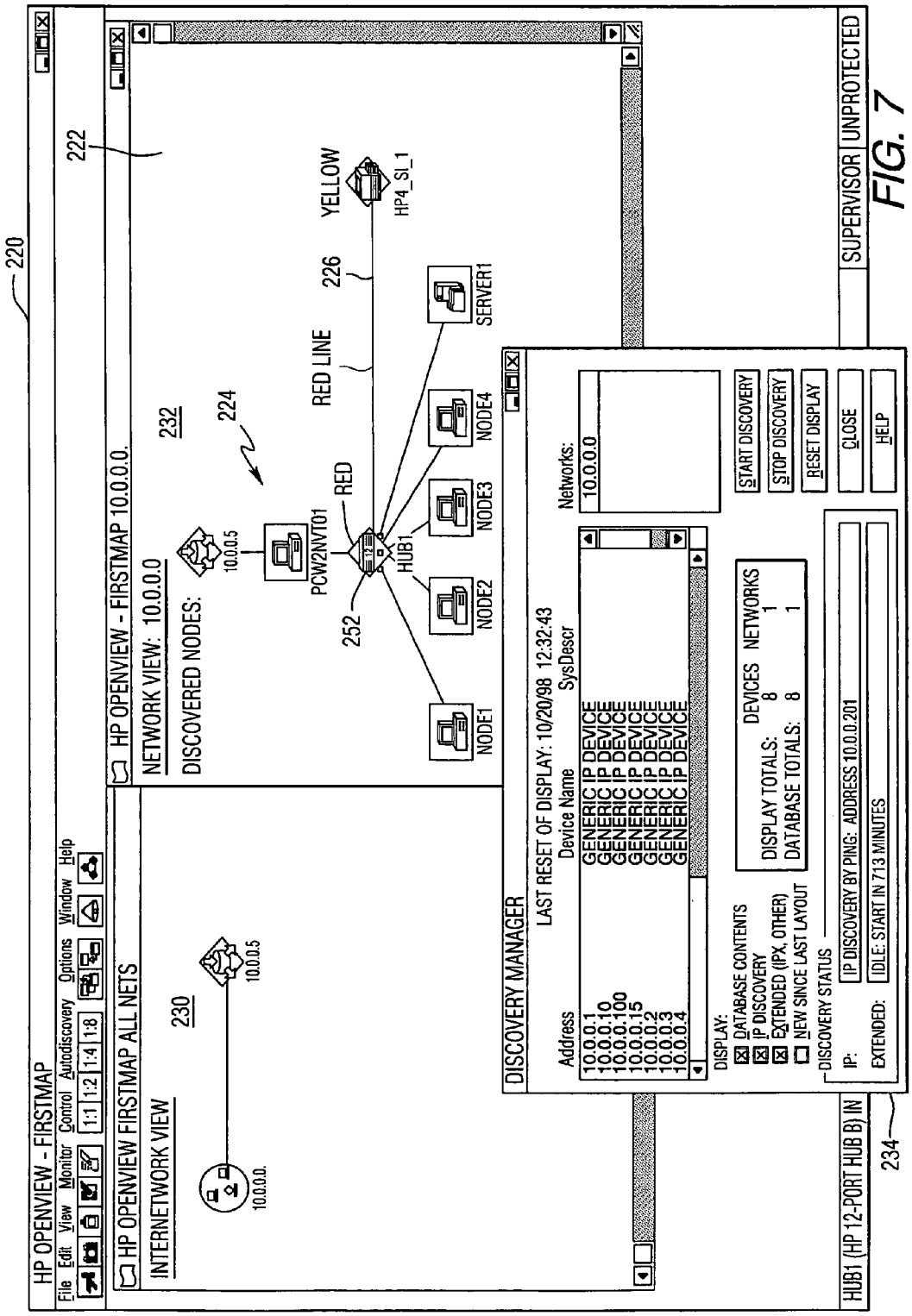
FIG. 7 is an example of a graphical user interface that models the network as a map.

In accordance with the present invention, the system and method of the NVT automatically maps an existing network and can display the existing network as a model on a graphical user interface, such as shown in FIG. 7. For example, HP Open View could graphically depict a network topology. Once the software has been given the IP address of a default router for the network, the NVT of the present invention can use Open View and search for computers and other devices attached to the network. NVT performs an active search, pinging possible IP addresses on the network, and adding whatever response information it receives to its network map. NVT also provides a manual method to draw a proposed network with the graphical user interface, as illustrated, to support drag and drop. A system architecture can be defined, including security critical information for alternative designs or node editing to provide additional details as required to provide complete logical network planning. A user can also represent an entire network on a map by using a sub-network icon.

When a network system description has been completed, the NVT of the present invention represents and stores the description in an object/class hierarchy, as shown as an example in FIGS. 16 and 17, as will be explained below. A single topological system object model supports the information data needs of the disparate network vulnerability analysis programs (tools). Fuzzy logic processing of the results allows correlation of the results from the programs into a cohesive vulnerability/risk assessment to obtain a vulnerability posture of the network, as shown in the graphical user interface at FIG. 10. The single representation of the system simplifies the use of multiple tools and eliminates redundant data entry. It also provides a foundation for addressing the problem of incomplete data for a given vulnerability assessment tool and future knowledge negotiation capabilities.

Figure 3:
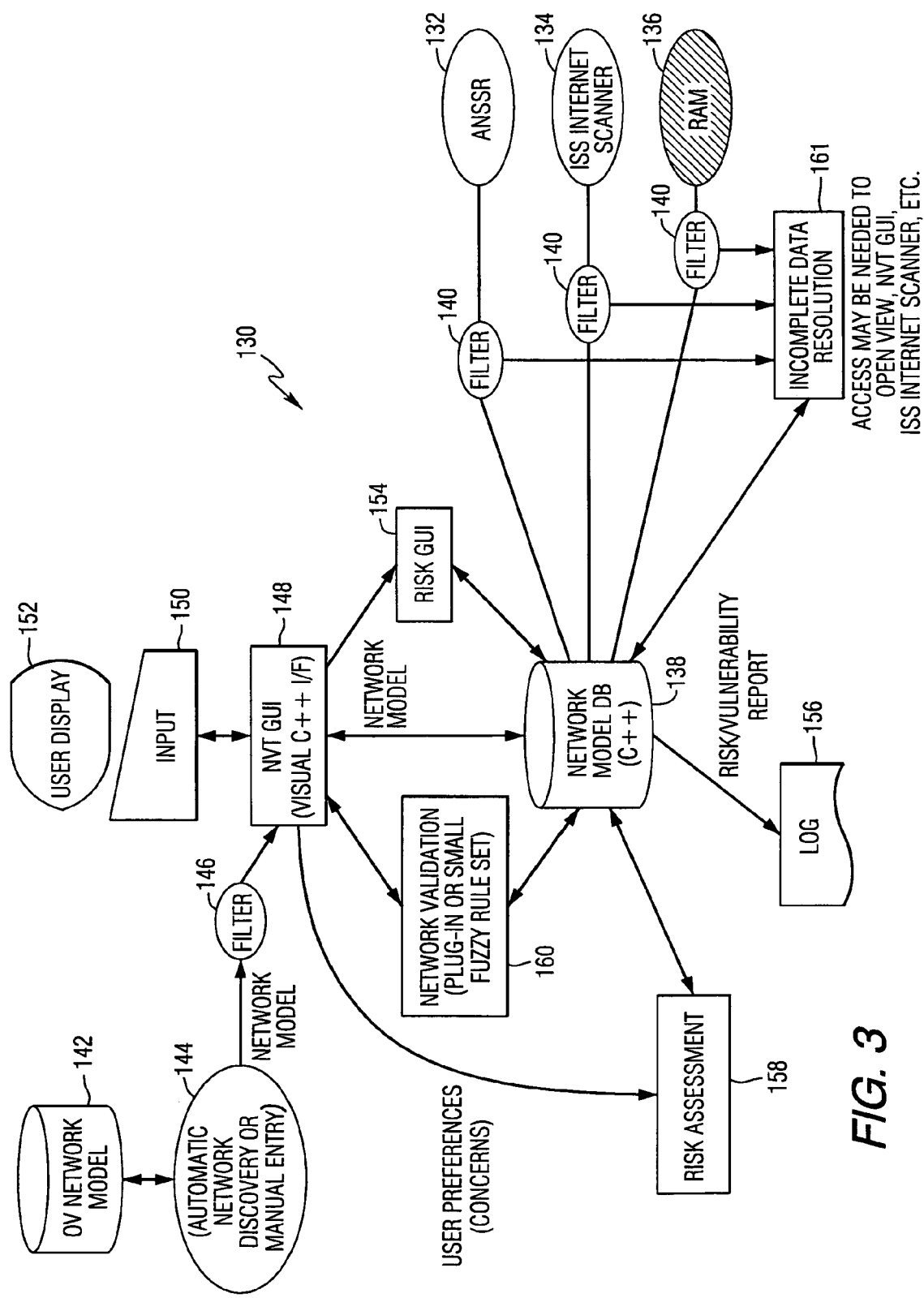
FIG. 3 is another block diagram showing overall architecture of the system and method of the present invention and showing filters used in association with the network model database.

FIG. 3 illustrates at 130 an example of the overall network visualization tool (NVT), data processing system of the present invention, where three network vulnerability analysis programs (tools) are illustrated as ANSSR 132, ISS Internet scanner 134, and RAM 136. The system and method of the present invention creates a system object model database (Network Model DB) 138 that represents a network and supports the information data requirements of the network vulnerability analysis programs. The system object model database 138 represents a single representation of the assessed system or design, and addresses the need for a single internal representation of a network to provide data to the network vulnerability analysis programs.

This model 138 uses object oriented (OO) methodology to provide an extensible set of components in a class hierarchy that can be combined to represent a network. The class hierarchy provides a means of defining components with shared common traits, while retaining the specifics that distinguished it from other components. In addition to an implicit hierarchical relationship, object oriented techniques provide a containment mechanism in which an object can contain a reference to any object, including itself. This provides a flexible mechanism for representing any physical or logical entity. Also, object oriented representation lends itself to ready modification and extension and is ideal for an information assurance arena where changes and new technologies arise daily.

As shown in FIG. 3, filters 140 are associated with each of the network vulnerability analysis programs 132, 134, 136 and allow only that data required by a respective network vulnerability programs to be exported to the tool (program). The filters are a C++ base class that provide a set of virtual methods to allow data movement between the NVT system and a program. The filter also provides a means for the NVT to control execution of the tool and complete data needed by a tool. NVT views each tool as a filter, calling the appropriate method within the filter to perform the desired task, including initializing, running, importing data and exporting data. Each tool can have a concrete filter subclass and provide the means to define each method specifically for the tool, while still providing the generic and well-defined programming interface (API) to NVT. This allows all tools to be treated the same within NVT, allowing the addition and removal of tools without changing any of the existing NVT codes.

Establishing communication between DPL-f and NVT using the filter technology is straightforward. A DPL-f filter is tasked with the specifics of building and populating fault trees. As an analysis tool, a default tree can represent a node in a network as developed and provide a probability value for events such as denial of service, loss of data and data compromise. Actually, DPL-f can be used as a final result tool.

The network is then analyzed with each network vulnerability analysis program to produce data results from each program. The data results are correlated to determine a security posture of the network. Network validation can occur through the fuzzy logic processing of the invention, as will be explained below, and the system GUI can have input to a user display.

An overview of the network is created as a model 142 by an automatic network discovery or manual entry 144, such as through HP Open View, and an appropriate filter 146 allows the system GUI 148 to display the network model as shown in FIG. 7 via an appropriate data input 150 to a user display 152. It is also possible to have a risk GUI 154 to assess visually the risk vulnerability, a log 156 of the risk/vulnerability report, a risk assessment 158 as part of the GUI 148, all through the network validation 160, using a plug-in or fuzzy rule set as will be described in greater detail below. Any incomplete data resolution 161 can also be handled.

Figure 4:
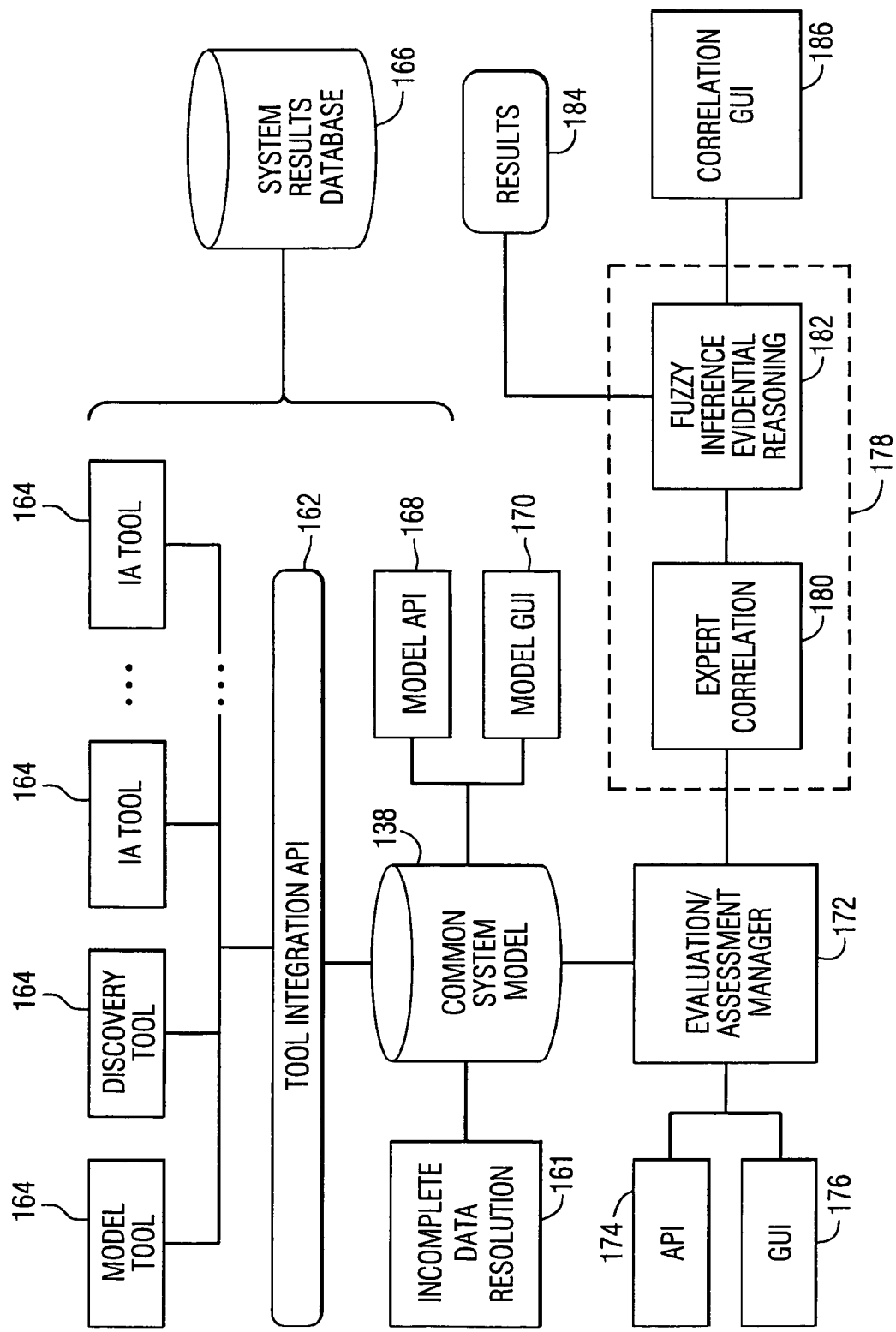
FIG. 4 is another schematic block diagram of the architecture of the present invention showing the fuzzy logic analysis.

FIG. 4 illustrates a high level block diagram similar to FIG. 3, showing the system object model database 138 that can be established and work in conjunction with an integrated application programming interface 162 to allow importing of data into the various tools 164, as illustrated as a model tool, discovery tool and information analysis tools that result in the overall system results database 166. An application programming interface 168 and a graphical user interface 170 work in conjunction with model database 138. An evaluation/assessment manager 172 (manager) works in conjunction with an application programming interface (API) 174 and graphical user interface (GUI) 176 to correlate data results with fuzzy logic processing, indicated by dotted lines 178, including expert correlation 180 and fuzzy inferences and evidential reason 182 to produce vulnerability results 184 and a graphical user interface (GUI) 186 for the correlated results. Although FIG. 4 represents a high level model showing an example of different components, it is only one example of one type of high level components that could be used with the NVT system and method of the present invention.

Figure 5:
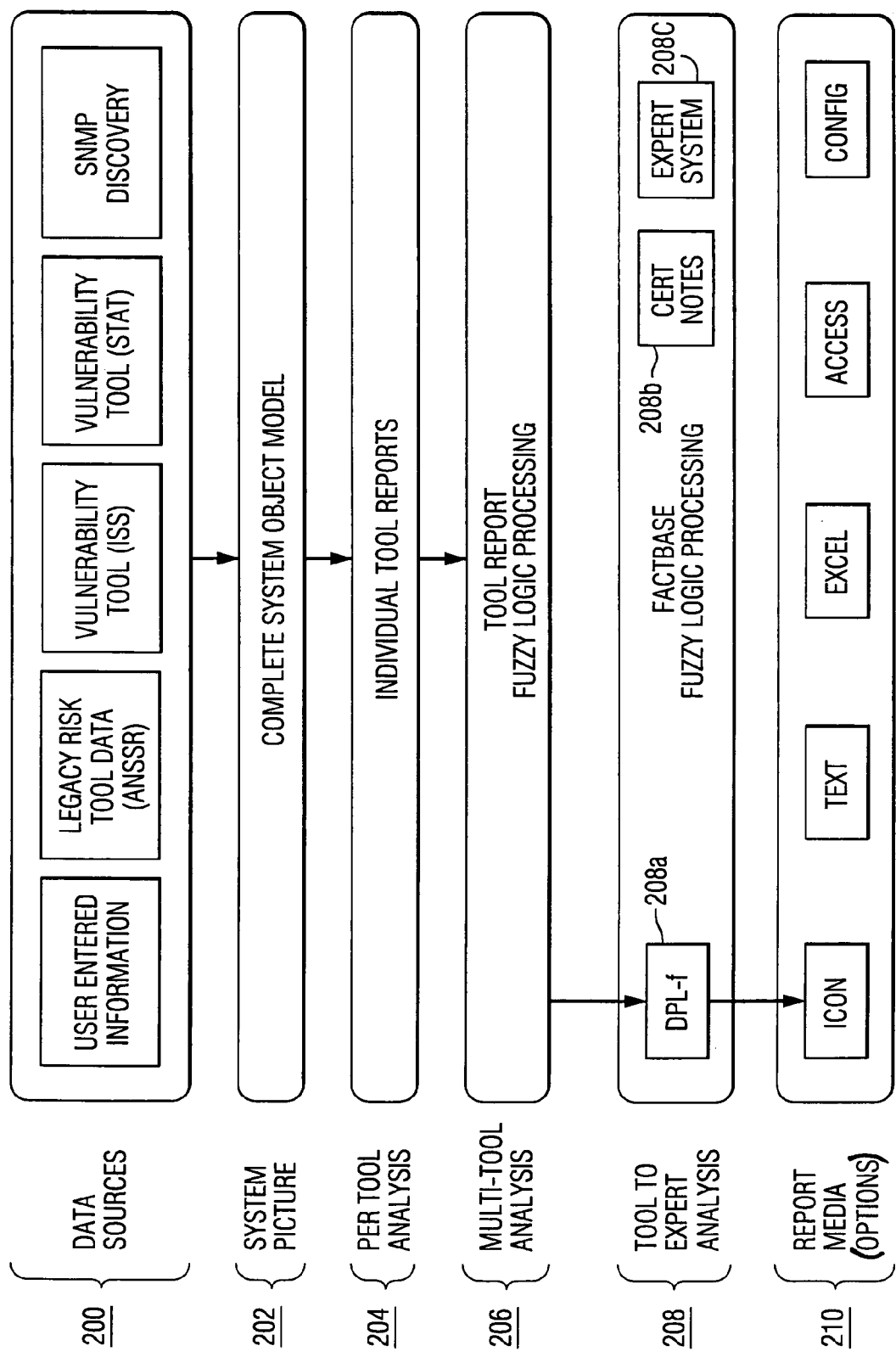
FIG. 5 is another schematic block diagram showing high level architecture components of the data processing system and method of the present invention.
Figure 6:
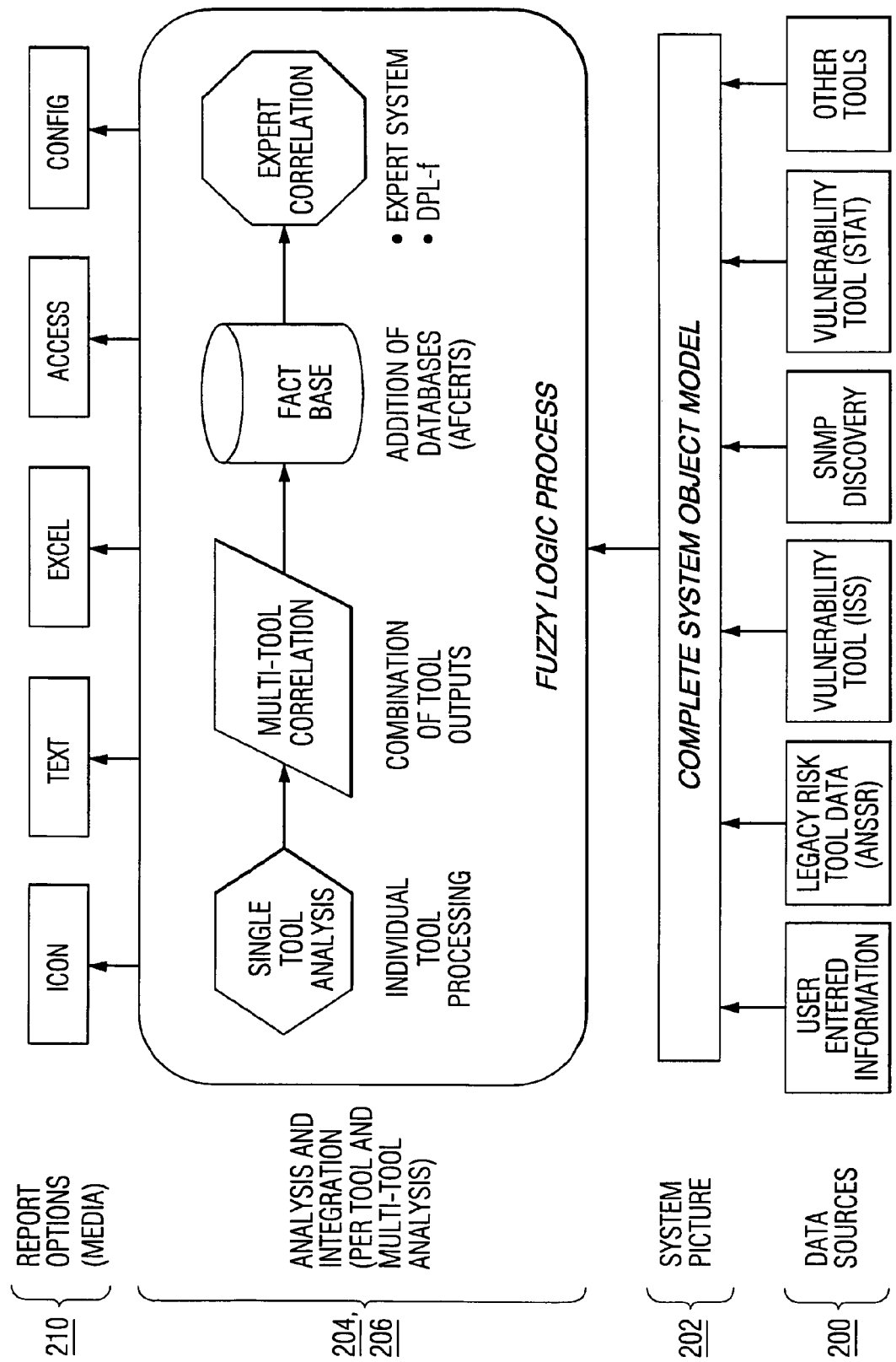
FIG. 6 is another high level schematic block diagram of the data processing system of the present invention.

FIGS. 5 and 6 illustrate other examples of high level models showing basic components and processing steps of the data sources 200 (FIG. 5), together with the system picture 202, a per tool analysis 204, a multi-tool analysis 206, the tool-to-expert analysis 208, and report media 210. The tool-to-expert analysis 208 could include the DPL-f 208a as part of the fuzzy logic processing in a data fact base, and use with CERT notes 208b and an expert system 208c for expert correlation. Reports can be generated, including output as icons on a graphical user interface, text, an EXCEL spreadsheet, Access and Configuration, as known to those skilled in the art. FIG. 6 also illustrates another high level model similar to FIG. 5, where the tools used to form a complete system object model and fuzzy logic process could include the individual tool processing and the multi-tool correlation.

FIGS. 7–10 illustrate in greater detail a graphical user interface 220 that can be contained on a computer screen and used for interacting with the NVT and determining the vulnerability posture of a network. As illustrated, the graphical user interface 220 is a standard type of Windows™ interface. A system design window 222 permits the display of network icons 224 forming a network map that is representative of the relationship among different network elements and nodes contained within a network. Respective network icons 224 are linked together in an arrangement corresponding to how the network elements nodes are interconnected within the network. As shown in FIG. 7, the network elements can be linked together via connection lines 226, showing the interconnection that exists among actual network elements and nodes. The system design window 222 shows on the left side an internetwork view 230 with two nodes and a network view 232 on the right hand side of the window to illustrate a map of the network model. A manager window 234 is opened and displays properties of network elements.

A select data sensitivity pop up window (box) 240 is user selectable through the menu options for selected network elements (FIG. 8A), and has user selected items for selecting the sensitivity of network elements. The sensitivity for data on any node (node 1 in the example shown in FIG. 8A) can be selected for unclassified, sensitive, confidential, secret, restricted secret or top secret with appropriate Okay, Random and Default buttons.

Figures 8A, 8B:
FIGS. 8A and 8B show open windows that provide data resolution in the establishment of the system object model database.
Figure 9:
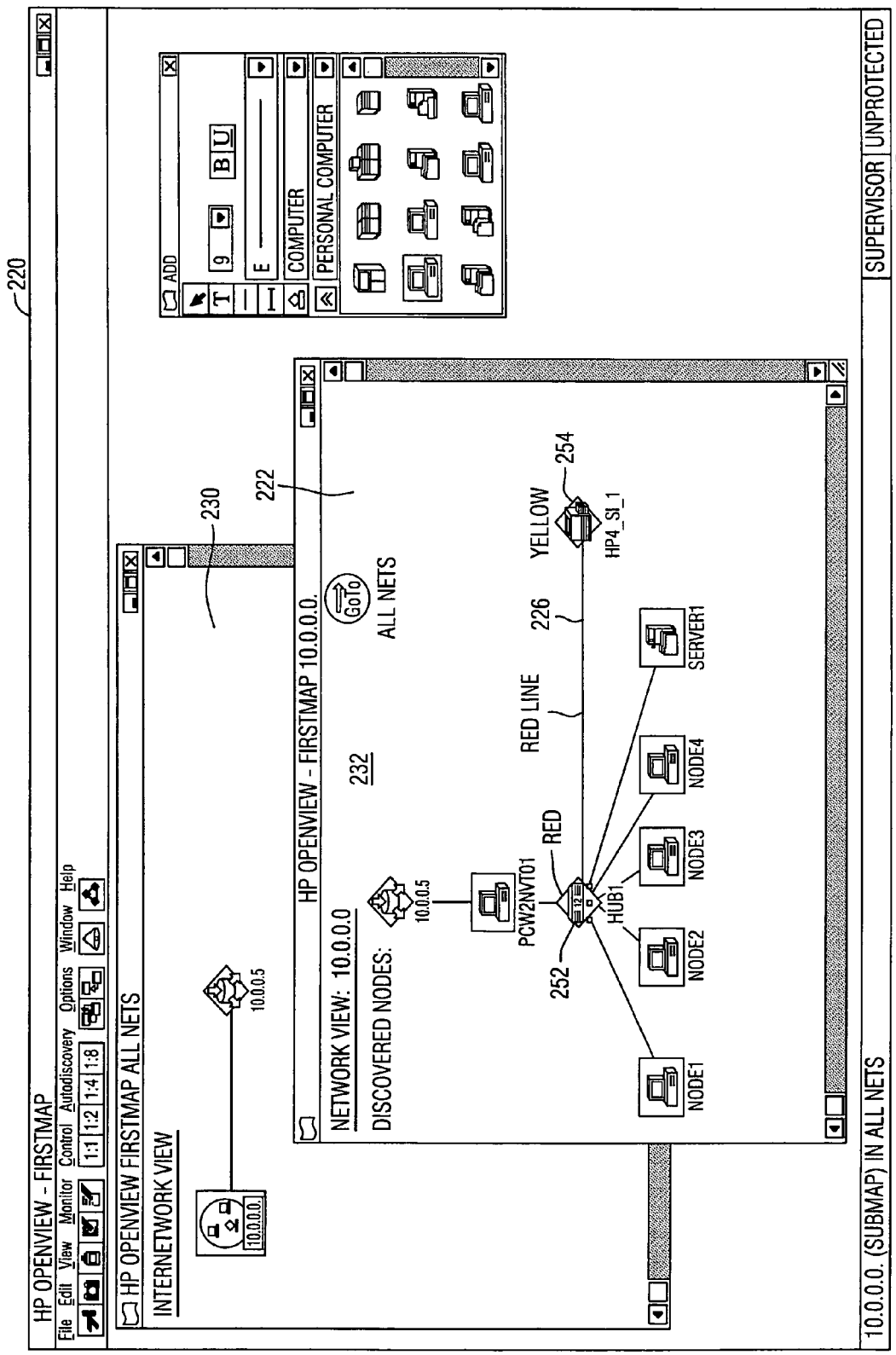
FIG. 9 is an example of a graphical user interface showing the network model.

A select node configuration edit pop up window (box) 250 is shown in FIG. 8B and can have user selectable vulnerability profiles for selecting a vulnerability profile of a network element or node. FIG. 9 also shows the network model diagram with the central hub and the interconnected nodes. It is possible that a user can edit the manager window 234 entries, which also allows the network discovery to occur through appropriate selection of buttons. Naturally, network icons can be selected and moved as necessary for editing and design alternatives.

After the security posture has been established through the system, icons representative of high risk network elements can turn colors, such as red, the hub 252. Other selected icons could turn yellow, indicative of a less severe risk node, such as the HP4 node 254 shown in FIGS. 7 and 9. It is possible that shaded areas around the node or portions of the network could be colored red or yellow indicative of higher risk vulnerability. It is also possible that the connection line could turn red or yellow to indicate a poor connection between elements.

Figure 10:
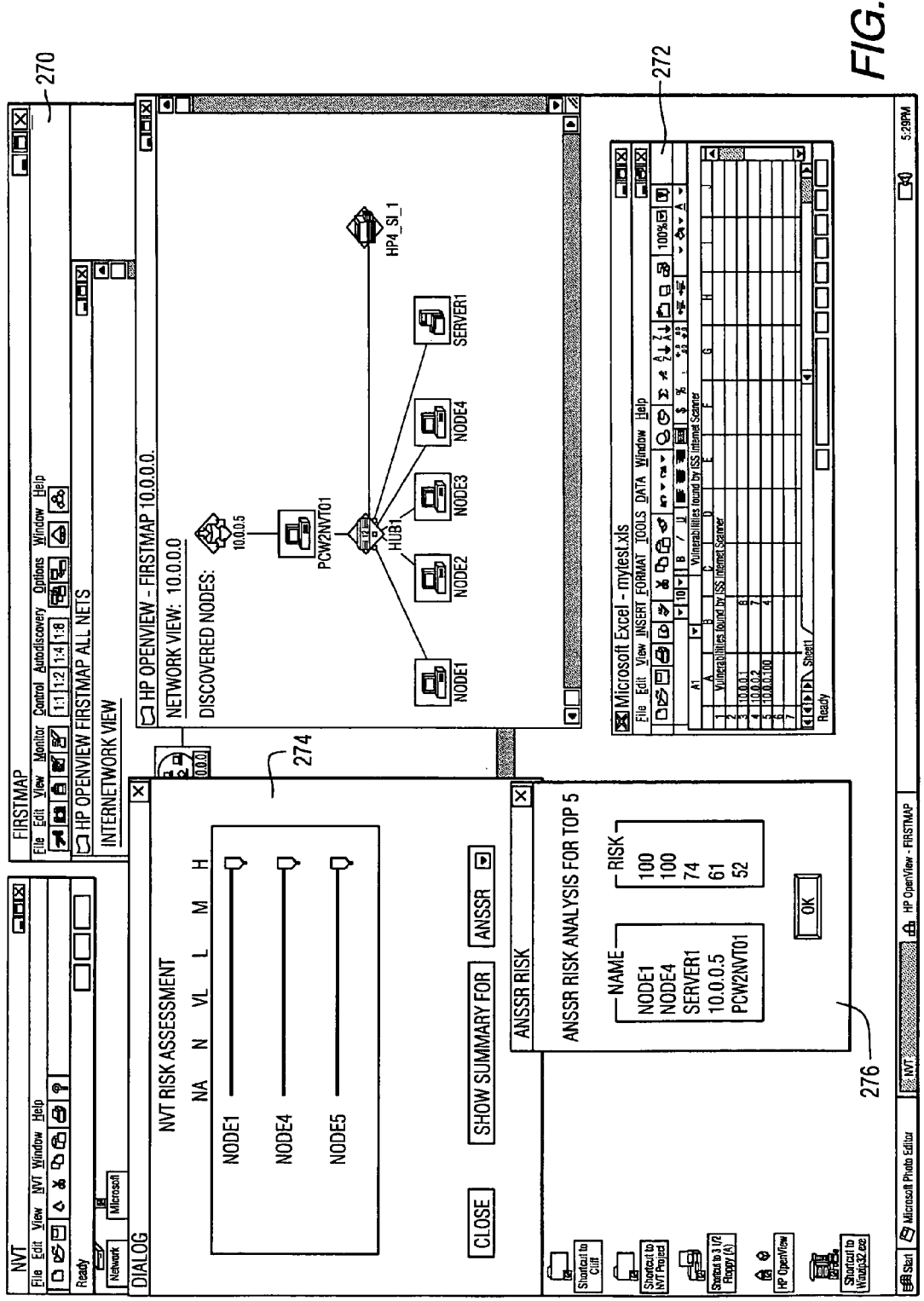
FIG. 10 is a graphical user interface showing various reporting options for the security posture of the network.

FIG. 10 illustrates a vulnerability posture window 270 for displaying user readable icons indicative of vulnerable network elements and icons. The overall system model is shown as part of an open system design window. However, a spreadsheet 272 is illustrated and a NVT risk assessment chart 274 having slider bars for risk assessment. A risk analysis window 276 showing the top five risk analysis elements is also illustrated.

Figure 16:
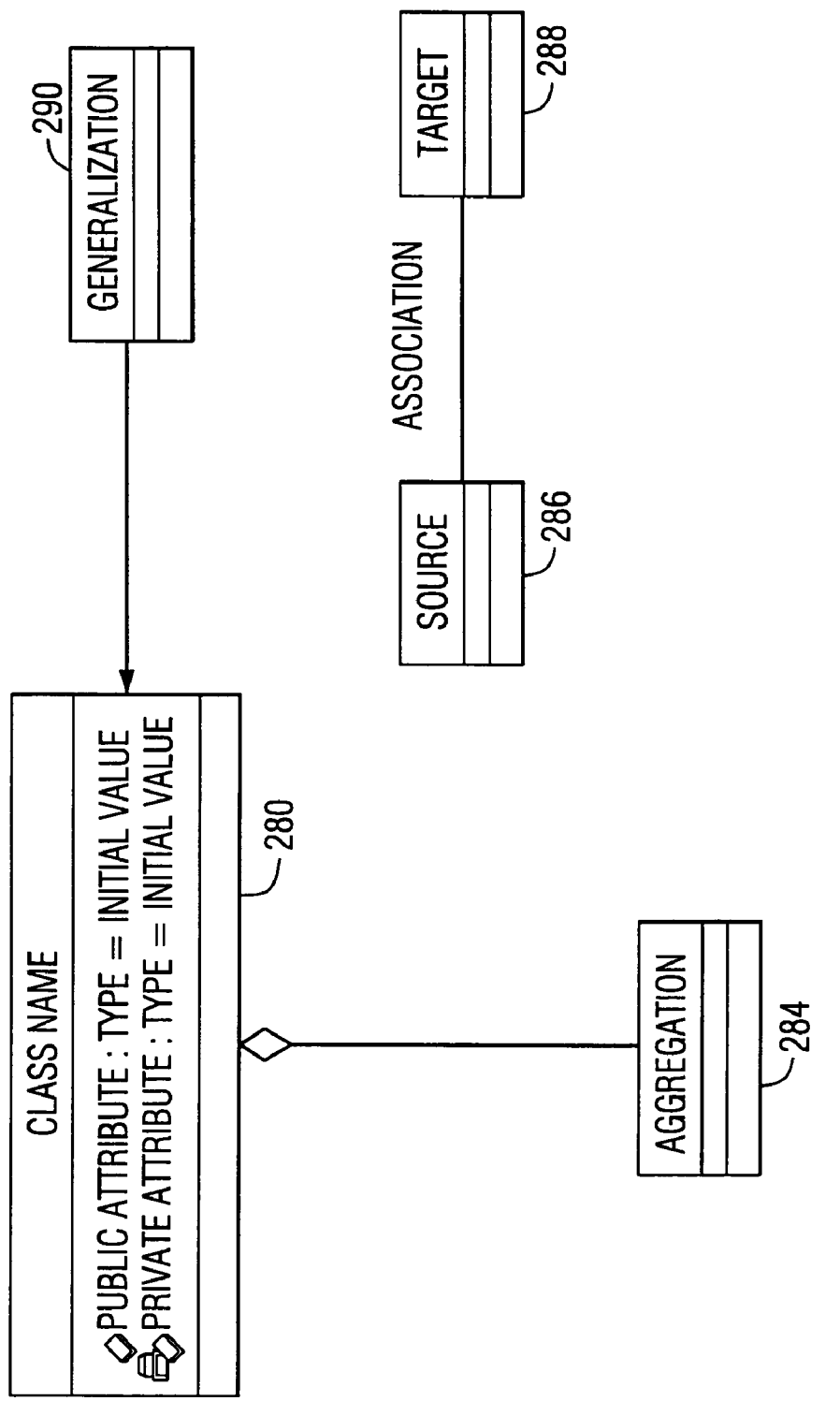
FIG. 16 is a block diagram showing an object/class hierarchy.
Figure 17:
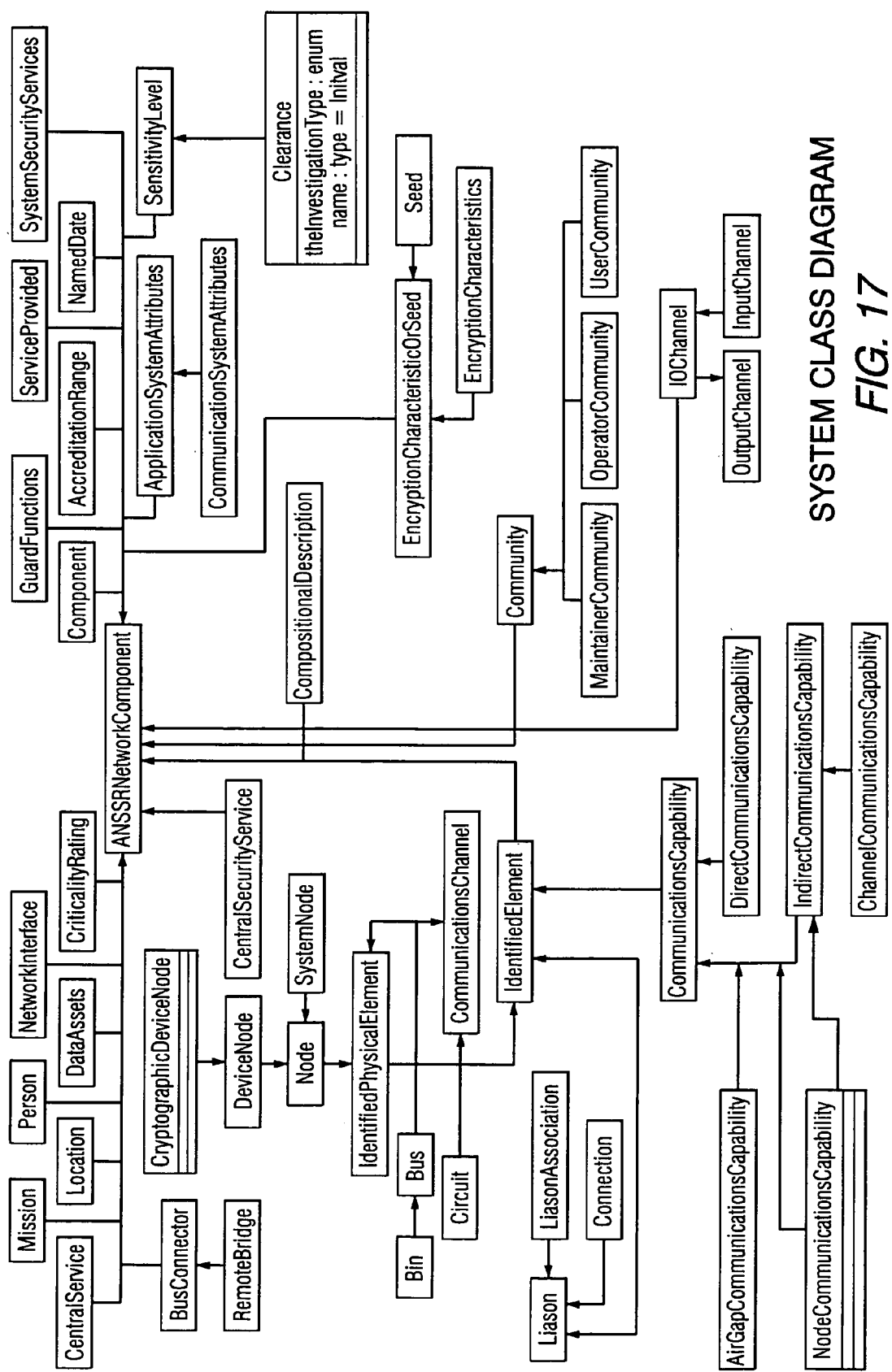
FIG. 17 is a block diagram showing the system class diagram of the present invention.

FIG. 16 shows in greater detail a class hierarchy with the Class Names 280 as public attributes and private attributes, the Aggregation 282 and Association 284 of Source 286 and Target 288 with Generalizations 290. FIG. 17 illustrates an example of a system class diagram with various components identified in the blocks. Naturally, FIG. 17 is only a system class diagram as is known to those skilled in the art and is an example of what can be used for the system and method of the present invention.

Figure 11:
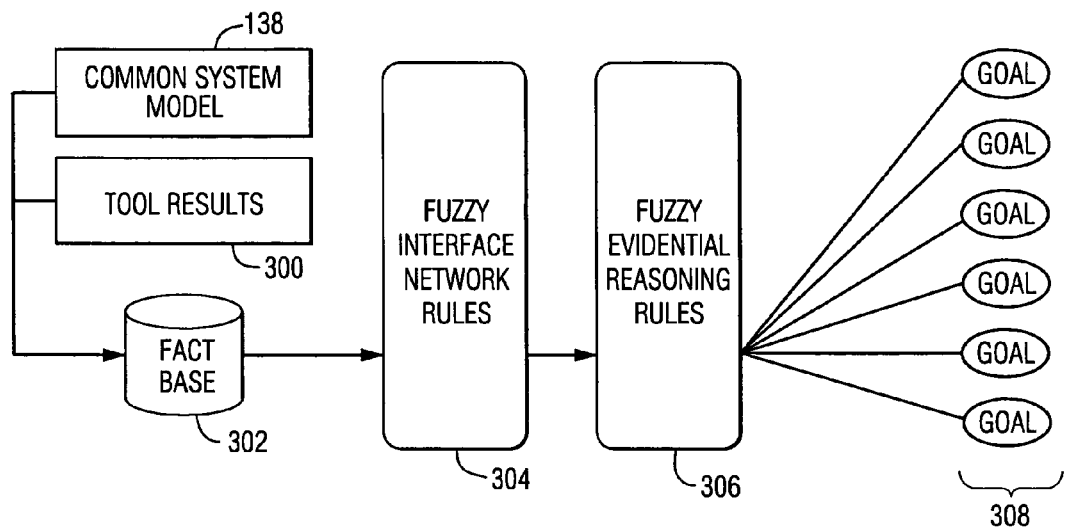
FIG. 11 is a block diagram showing the basic processing components of the goal oriented fuzzy logic processing used in the data processing system and method of the present invention.

Referring now in greater detail to FIGS. 11–15, the goal oriented fuzzy logic decision making is illustrated. As shown in FIG. 11, the system model database 138 and results 300 from the respective network vulnerability analysis programs are combined together using an applications programming interface and expert correlation to form a data fact base 302 through data fuzzification. Goal oriented fuzzy logic decision rules operate through fuzzy inference network rules 304 and fuzzy evidential reasoning rules 306 to determine the security posture of a network based on predetermined goals 308.

The fuzzy logic processing of the present invention uses data fusion, evidential reasoning and inference network techniques. As known to those skilled in the art, evidential reasoning is a technique in which facts are gathered that support and refute a given hypothesis. The result is the proof or rejection of the hypothesis with a certain degree of confidence. The fuzzy logic processing of the present invention uses evidential reasoning to accumulate evident from the system and tool findings for each criteria, thereby merging the system assessment data into a single point of reference, the conformance of the system to a particular criteria. By suppling a set of criteria for fusion, the system constrains the fusion problem and reduces the search base. Evidential reasoning has previously been used to perform level-one multi-sensor data fusion, and is a common global reasoning technique in fuzzy expert systems, such as the type of system known to those skilled in the art as fuzzyCLIPS, developed by NASA. The result is a set of fuzzy evidential rules whose purpose is to accumulate evidence for a given set of requirements. This resolves potentially conflicting, ambiguous and redundant data from expert correlation and draws conclusions with available data, even if it is incomplete.

The accuracy of the result is contingent upon the quantity and quality of the data available and it may be necessary to perform additional refinement on the available data prior to the application of fuzzy logic processing, while also maintaining the probabilistic nature of the data. This refinement uses inference networks and provides a method of reasoning about probability using heuristics, thereby removing the need for extensive a priori knowledge. The relation between the goals and potential security metrics encourages cross fertilization. As known to those skilled in the art, the fuzzyCLIPS uses fuzzy facts, which can assume any value between 0 and 1. The result can be viewed as a two dimensional plot of a continuous function bounded vertically by 0 and 1.

Data fusion is used with the system object database, data results data fact base. Intelligence data fusion is a multi-level, multi-disciplinary-based information process to yield the integration of information from multiple intelligence sources (and perhaps multiple intelligence disciplines) to produce specific and comprehensive, unified data about an entity (its situation, capabilities, and the threat it imposes). Data fusion provides information based on the available inputs. The intelligence data fusion process is typically partitioned into four levels, described in Table 1 below.

TABLE 1

THE LEVELS AND PURPOSES OF THE INTELLIGENCE DATA FUSION PROCESS

| | Data Fusion Level | Description |
|---|---|---|
| 1 | Object Refinement | Transforms data into consistent frame of reference |
| | | Refines and extends, in time, estimates of object position, kinematics or attributes |
| | | Assigns data to objects to allow application of estimation process |
| | | Refines the estimation of object identity |
| 2 | Situation Refinement | Develops description of current relationships among objects and events in the context of the environment |
| | | A symbolic, reasoning process by which |

TABLE 1-continued

THE LEVELS AND PURPOSES OF THE INTELLIGENCE
DATA FUSION PROCESS

| Data Fusion Level | | Description |
|---|---|---|
| | | distributions of fixed and tracked entities and events and activities are associated with environmental and performance data in the context of an operational problem |
| 3 | Threat Refinement | Projects the current "situation" into the future and draws inferences about threats, vulnerabilities and opportunities for operations |
| 4 | Process Refinement | Monitors process performance to provide information for real-time control and long-term improvement |
| | | Identifies what information is needed to improve the multi-level fusion product |
| | | Determines the source specific data requirements to collect required information |
| | | Allocates and directs the sources to achieve mission goals |

As noted before, NVT combines multiple types of data, from multiple sources, with other contextual information to form an integrated view of a networked system's security posture. NVT provides a user with a simple expression of the vulnerability posture of a given system or system design, and enables them to perform "what if" analysis for functionality, performance, and countermeasure trades, for the purpose of refining and improving the system or system design.

In computer security engineering, sensors are the various vulnerability assessment and risk analysis tools, along with the GUI to gather information, as needed, from the user. The resulting outputs from these tools take the form of both qualitative and quantitative data, in a variety of formats from different vendors. For computer security engineering, the objects of interest are the nodes in a network (computing system), i.e. the assets, including hardware, software and data. The situation of interest is an assessment of the weaknesses in the security system of a computer network segment that might be exploited to cause harm or loss of secrecy, integrity or availability.

Assessing the risk faced by a computing system involves an assessment of the threats faced, their likelihood of occurrence (exploitation), and the expected cost of the loss (or harm). Finally, the network (computing system) can be refined based on the results of cost-benefits analysis. This requires information on protective measures (controls or countermeasures) appropriate for particular vulnerabilities and their costs. The cost-benefit analysis seeks to determine if it costs less to use a control or countermeasure, or accept the expected cost of the loss. This leads to the development of a security plan to improve security of a computer network system.

Figure 12:
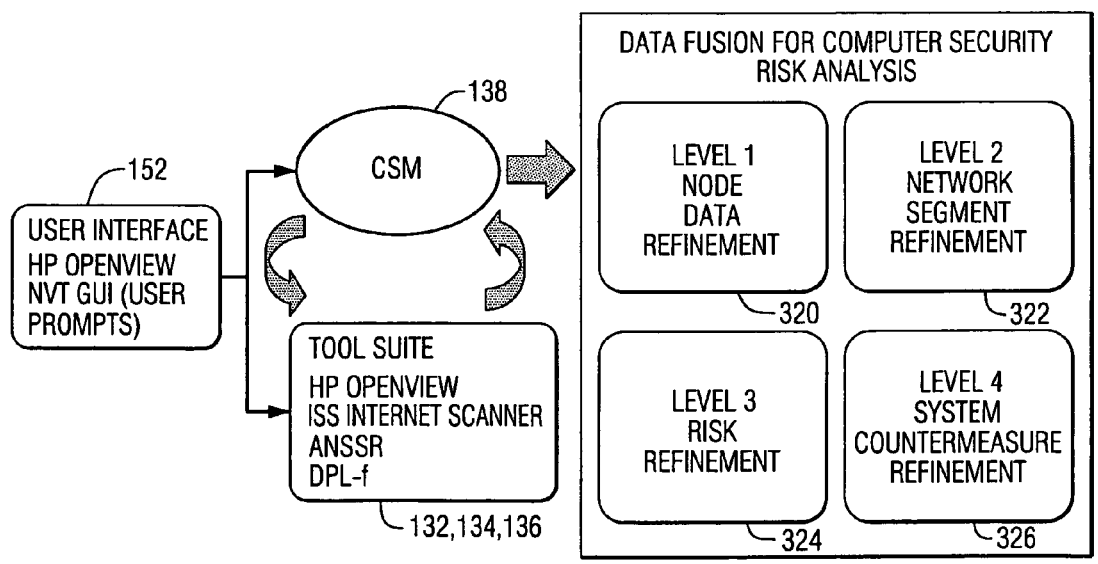
FIG. 12 is a schematic block diagram of the data fusion used in the data processing system and method of the present invention.
Figure 13:
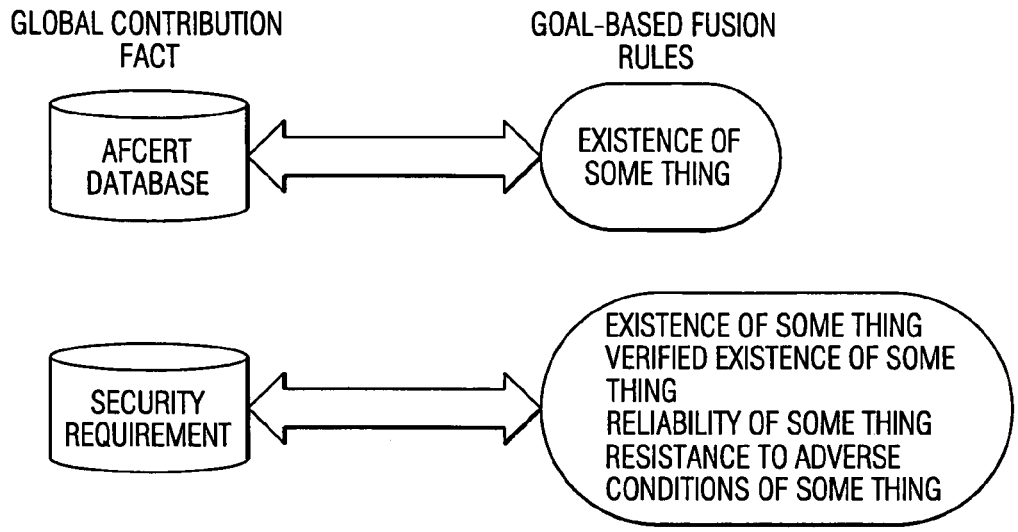
FIG. 13 is another schematic block diagram showing an example of gold-based fusion rules used in the data processing system and method of the present invention.

Table 2 contains an example of a first partitioning of this data fusion process for computer security engineering that could be used with the present invention, with four processing levels, corresponding to the four levels found in Table 1. As illustrated in FIG. 12, inputs to this process would consist of the object model database 138, results from individual tools 132, 134, 136, and other contextual information. The different data fusion levels 1–4 are indicated generally at 320, 322, 324 and 326.

TABLE 2

INITIAL PROCESSING LEVELS OF DATA FUSION FOR
COMPUTER SECURITY RISK ANALYSIS

| | Data Fusion Levels | Description |
|---|---|---|
| 1 | Node Data Refinement | Transforms data into consistent frame of reference |
| | | Refinement of data at the network node-level (the objects for computer security data fusion) |
| | | Data from multiple tools - correlated (assigned to appropriate nodes) and possibly combined at each node |
| | | Refines the estimation of object identity - network node (workstation) is a system-of-systems, consisting of an OS, critical applications, a database and data |
| | | Vulnerability analysis at this level does not yet constitute situation assessment |
| 2 | Network Segment Refinement | Refinement of the situation at the network segment-level (system-of-systems level) |
| | | Develops description of current relationships among objects (nodes) in the context of the environment (a network segment) |
| | | A symbolic, reasoning process by which information about entities (nodes, network segments) and environment are associated with evidence about computer security goals, requirements |
| | | Combining tool results at the network segment-level |
| | | The situation of interest is the assessment of the network segment's vulnerabilities or exposures |
| 3 | Risk Refinement | Refinement of the exposures and their potential for harm (risk) within a computing system |
| | | Projects the current "situation" (state of the computer network system) into the future and draws inferences about threats, vulnerabilities and opportunities for operations |
| | | Based on vulnerabilities, concerns, context, cost, threats |
| | | Refinement of a system design with the identification of controls that reduce one or more vulnerabilities |
| | | Based on countermeasures, components, cost |
| | | Identifies what information is needed to improve the multi-level fusion product |
| | | Facilitate long-term improvement of the system |

While the data fusion used in the present invention provides a conceptual framework for addressing the problem of merging results from multiple vulnerability assessment and risk analysis tools, expert systems, inference networks and evidential reasoning are used to implement the fusion concepts and merge tool results. The flexibility of fuzzy decision technology, in particular, fuzzy expert systems, offers the means to address these problems. A primary benefit of a fuzzy expert system is its ability to use and assimilate knowledge from multiple sources.

Fuzzy logic provides the technique for representing and inferring from knowledge that is imprecise, uncertain or unreliable. Similar to traditional expert systems, a fuzzy expert system can represent knowledge in the form of a system of IF/THEN rules in which the antecedents, consequent, or both are fuzzy rather than crisp. Fuzzy logic is used to determine how well fuzzy facts match the rules, and to what degree this match affects the rule's conclusion.

In accordance with the present invention, an inference network is a hierarchy of heuristic rules that can propagate probabilities without requiring extensive knowledge of a priori probabilities (e.g. Bayesian networks). The heuristic rules can be developed using expert knowledge on how the probabilities propagate, allowing conclusions to be drawn with limited knowledge of a priori probabilities. This results in low-level discrete probabilities being accurately reflected in higher-level conclusions. Probabilities of low-level events (such as probability of password compromise based on lifetime) need to be part of any conclusions drawn on higher-level events (vulnerability of password).

Initial studies of NVT uses accumulation of evidence to modify a fuzzy-fact and represent the change in state required by the current system. This state change fuzzy-fact is then used to modify the system and the new state is fed back into the change of state rules in an endless cycle, using global contribution. FuzzyCLIPS allows the definition of fuzzy-fact types, but only one fact of each type will ever exist. Therefore every rule that manipulates that fact type actually modifies a single fact, leading to accumulation of evidence.

Global contribution and accumulation of evidence have lead to a FuzzyCLIPS methodology that defines fuzzy-facts representing different vulnerability states. These facts will use global contribution and accumulation of evidence to acquire final values reflecting the tested system's vulnerability, i.e., evidential reasoning. This method reflects the well-defined use of fuzzy logic control systems, limiting the execution to a finite number of cycles instead of allowing it to run continuously. FuzzyFusion™ has been developed by Harris Corporation of Melbourne, Fla., and will use this methodology to accumulate evidence from rules based on knowledge from network security experts. In particular, FuzzyFusion™ will employ evidential reasoning as a technique in which facts are gathered supporting and refuting a given hypothesis. The result is the proof or rejection of the hypothesis with a certain degree of confidence.

Initial knowledge extraction has resulted in the use of security requirements to accumulate evidence, i.e. how well does a system meet the requirements. This demonstrates a strong correlation between the methods of verifying a database (e.g. AFCERTS) and verifying security requirements, leading to using the database and requirements as global contribution facts to accumulate evidence, illustrated in FIG. 13. This also shows how varying the granularity of the goals directly impacts the granularity of the assessment, i.e. the assessment will only be as detailed as the goals. The accumulation of evidence is being viewed as a goal orientated approach to obtaining the results while maintaining the use of a forward inference technique, and for now will be phrased as "Goal-based Fusion".

One example of how fuzzy logic can be applied with merging tool results in computer security uses the combination of results from ANSSR and ISS Internet Scanner, two of the tools currently used within one aspect of NVT. The outputs of the tools are both quantitative (ANSSR) and qualitative (Internet Scanner). Fuzzy logic allows the system to represent both data types within the same system. Then an initial hypothesis is formulated, and fuzzy logic is used to gather evidence to contradict or support the hypothesis.

For this example, an initial hypothesis could be that auditing is invalid in an existing network system. The system user then exercises the ANSSR and ISS Internet Scanner tools. If ANSSR supplies a number 90 (out of 100), that auditing is sufficient. Fuzzy logic allows NVT to account for this as strong refuting evidence for the initial hypothesis that auditing is invalid. If Internet Scanner supplies the qualitative data that User Access is not audited, fuzzy logic accounts for this as supporting evidence, which is combined with the evidence from ANSSR. When the tools are finished, the contributing evidence for auditing is represented as a single fuzzy fact that provides a measure of how well auditing is implemented.

FuzzyFusion™ as developed by Harris Corporation of Melbourne, Fla. is a means to consolidate and merge the results of vulnerability assessment and risk analysis tools, employed within the NVT into a unified report. In particular, FuzzyFusion™ is developed to implement Levels 1 and 2 fusion. FuzzyFusion™ is accomplished through the use of a fuzzy expert system (Goal-Oriented Fuzzy Logic Decision Rules) using FuzzyCLIPS, which combines the outputs of the various tools, user concerns about system risks and vulnerabilities, and expert understanding of the results of each tool and how these fit into a larger information system security picture. Thus, NVT users obtain a simple expression of the security posture of a given computing system, or system design, and can perform "what if" analysis for functionality, performance, and countermeasure trades.

Figure 14:
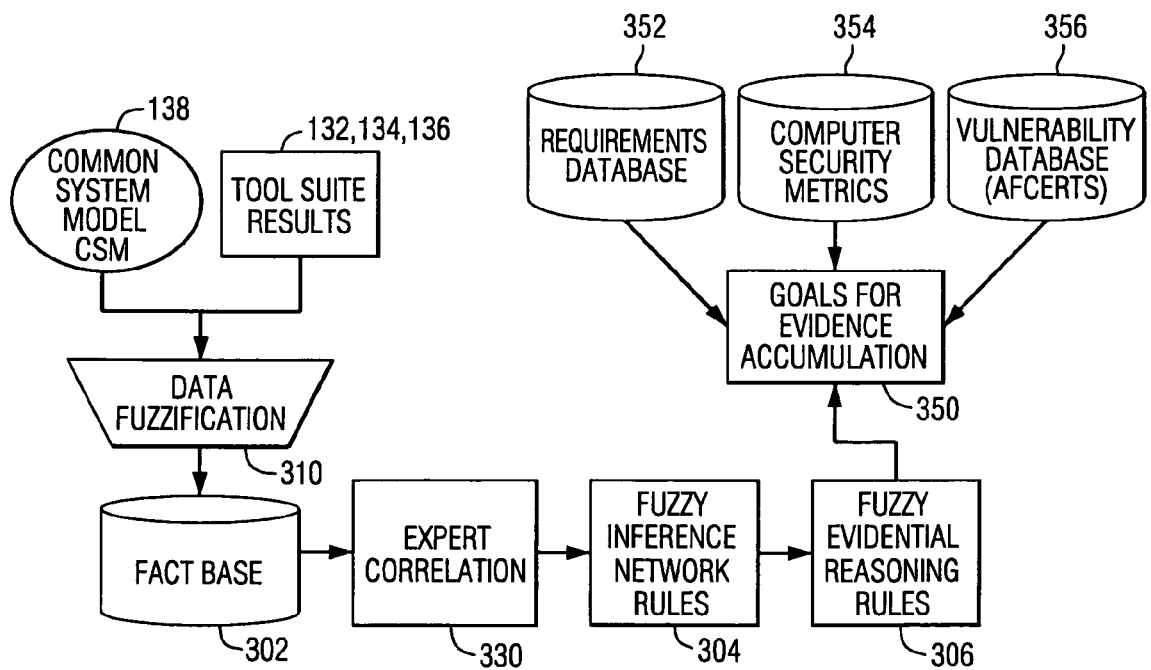
FIG. 14 is another block diagram showing basic processing steps and components used in the fuzzy logic processing of the data processing system and method of the present invention.

FIG. 14 illustrates the NVT FuzzyFusion™ component architecture for implementing the first two levels of data fusion for computer security engineering. As the figure illustrates, the task of modeling security expertise is partitioned into discrete tasks. Separation of Expert Correlation (Data Framework Merge Rules), Fuzzy Inference Network Rules, and Fuzzy Evidential Reasoning Rules addresses the problems of brittle expert systems and computational explosion. It also segregates low-level data correlation and fusion from the resolution of ambiguous/conflicting data and the merging of results into one picture. This should result in fuzzy expert systems that are easier to maintain than one large comprehensive system. Elements of this architecture are described below.

Data Fuzzification 310 converts the results from the individual vulnerability assessment and risk analysis tools 132, 134, 136 into fuzzy-facts, and stores those along with the Common System Model (CSM), i.e., system object model database 138, into the (FuzzyCLIPS) Fact-Base 302. Individual tool results (after fuzzification) and the CSM 138 are exported for Expert Correlation processing 3310 (Data Framework Merge Rules) to resolve system information and integrate tool output based on security expertise. Expert opinion can be used to determine the specific fuzzy values attributed to the low-level events.

The Expert Correlation (Data Framework Merge Rules) 330 is a collection of fuzzy expert rules to perform node-level data refinement (Level-1) or network-segment refinement (Level-2). These rules correlate and consolidate the (fuzzified) outputs from the vulnerability assessment and risk analysis tools, using expertise from security engineers. These rules leverage extensive experience in security assessment to resolve low-level systems data and tool results. These rules resolve system information and integrate tool output. Expert Correlation Rule processing 330 can also transform low-level data from the CSM and tool results into high level conclusions. For example, IF auditing is on with these flags,
AND the audit data is not backed up,
THEN auditing is unreliable.

Working from fuzzy-facts in the Fact-Base 302, a set of Level-1 fusion rules can consolidate the vulnerabilities for each node, resulting in a vulnerability rating for each node in the network. This rating can be imported back to NVT for display. Similarly, a set of Level-2 fusion rules can consolidate the vulnerabilities for each network segment, resulting in a vulnerability rating for each network segment. This can again be imported back for display.

The data is then subject to Fuzzy Inference Network Rules processing 304. It may be necessary to perform additional refinement on the available data prior to the application of Fuzzy Evidential Reasoning Rules 304, while maintaining the probabilistic nature of the data. This refinement will use inference networks, as known to those skilled in the art, which provides a method of reasoning about probability using hueristics, thereby removing the need for extensive a priori knowledge.

Fuzzy Evidential Reasoning Rules 306 are a collection of fuzzy expert rules to merge individual tool results into a higher level assessment, from a systems-level perspective, of a network's security posture. These rules provide a mechanism for merging the CSM, tool results and the results from the Expert Correlation (Data Framework Merge Rules) 330 into a unified report. This also removes the necessity of dealing with incomplete and conflicting data from the forward-chaining expert system used in Expert Correlation.

Evidential reasoning use a technique in which facts are gathered to support and refute a given hypothesis. The result is the proof or rejection of the hypothesis with a certain degree of confidence. FuzzyFusion™ uses evidential reasoning to accumulate evidence from the Common System Model and tool findings for each criterion, thereby merging the computer network system assessment data into a single point of reference, the conformance of the system to particular criteria. By supplying a set of criteria for fusion, NVT constrains the fusion problem and reduces the search space, referred to earlier as goal-based fusion. The result will be a set of fuzzy evidential rules whose sole purpose is to accumulate evidence for a given set of requirements. This resolves the potentially conflicting, ambiguous and redundant data from Expert Correlation (Data Framework Merge Rules) 330, and draws conclusions with the available data, even if it is incomplete. Obviously, the accuracy of the result is contingent upon the quantity and quality of the data available.

As noted before, the fuzzy logic processing is goal oriented. Goals for Evidence Accumulation processing 350 may be derived from a Security Requirements Database 352, a Computer Security Metrics Database 354, or a Vulnerability Database 356, such as a database composed of AFCERTs. Bounding fusion to pre-defined goals limits computation times. FuzzyFusion™ goals provide mechanism to obtain IA metrics.

The FuzzyFusion™ process has a number of advantages over traditional approaches. Crisp expert systems would require extremely large knowledge bases to encompass the necessary data and, yet, would still have a problem with incomplete data and conflicting results. Bayesian and probability networks require extensive and often unavailable a priori knowledge of probabilities. Algorithmic solutions do not fit the probabilistic and heuristic nature of the security problem.

Rete-based expert systems such as FuzzyCLIPS suffer from a geometric increase in execution time based on the number of rules and facts present in the system. This leads to breaking the analysis into subnetworks. FuzzyFusion™ will add subnetwork and scaling capabilities. The nodes for each subnetwork will be evaluated as a group, and then groups of subnetworks will be evaluated. Grouping the rules for each type of analysis into different modules will reduce the size of the Rete-network. In addition to decreasing execution time, this will also introduce a scalable method of analyzing networks that maps to the network model used by NVT.

Figure 15:
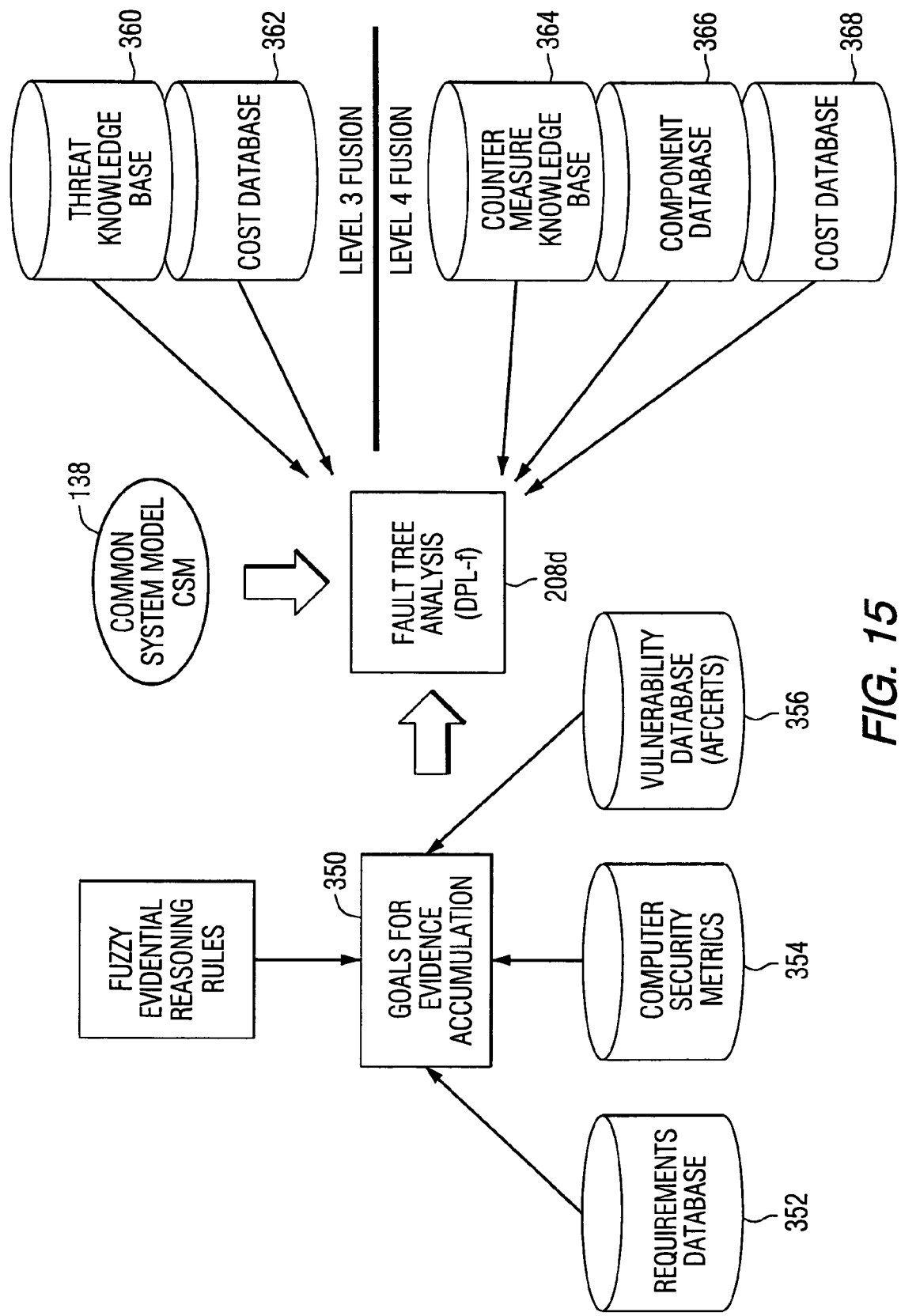
FIG. 15 is a block diagram showing basic components used in the fault tree analysis (DPLf) for evidence accumulation and fuzzy evidential reasoning rules.

As shown in FIG. 15, the other possible data spaces could include a threat knowledge database 360, cost database 362 as part of Level 3 fusion and a counter measure knowledge base, component database and cost database as part of Level 4 fusion.

This application is related to copending patent applications entitled, "SYSTEM AND METHOD FOR ASSESSING THE SECURITY POSTURE OF A NETWORK AND HAVING A GRAPHICAL USER INTERFACE" and "SYSTEM AND METHOD FOR ASSESSING THE SECURITY POSTURE OF A NETWORK USING GOAL ORIENTED FUZZY LOGIC DECISION RULES" which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A method for assessing the security posture of a network comprising the steps of:
   creating a system object model database representing a network, wherein the system object model database supports the information data requirements of separate, non-integrated network vulnerability analysis programs;
   exporting the system object model database of the network to the separate, non-integrated network vulnerability/risk analysis programs, wherein each analysis program is operative to run as a separate program and produce an initial data source separate from any data sources produced by respective other programs also running to produce a plurality of initial data sources for creating the system object model database;
   analyzing the network with each network vulnerability analysis program to produce data results from each program; and
   correlating the data results of the network vulnerability analysis programs to determine the security posture of the network.

2. A method according to claim 1, and further comprising the step of importing the system object model database to the network vulnerability analysis programs via an integrated application programming interface.

3. A method according to claim 1, and further comprising the step of modeling the network as a map on a graphical user interface.

4. A method according to claim 1, and further comprising the step of establishing a class hierarchy to define components of the network vulnerability analysis programs that share common data and programming traits.

5. A method according to claim 1, and further comprising the step of correlating the data results of the network vulnerability analysis programs using fuzzy logic processing.

6. A method according to claim 1, and further comprising the step of running the network vulnerability assessment/risk analysis programs to obtain data results pertaining to network system details, network topologies, node level vulnerabilities and network level vulnerabilities.

7. A method for assessing the security posture of a network comprising the steps of:
   creating a system object model database representing a network, wherein the system object model database supports the information data requirements of separate, non-integrated network vulnerability/risk analysis programs, wherein each analysis program is operative to run as a separate program and produce an initial data source separate from any data sources produced by respective other programs also running to produce a plurality of initial data sources for creating the system object model database;

importing the system object model database of the network to the network vulnerability analysis programs through filters associated with each respective network vulnerability analysis program to export only the data required by a respective network vulnerability analysis program;

analyzing the network with each network vulnerability analysis program to produce data results from each program; and correlating the data results of the network vulnerability analysis programs to determine the security posture of the network.

8. A method according to claim 7, and further comprising the step of exporting the system object model database to the network vulnerability assessment/risk analysis programs via an integrated application programming interface.

9. A method according to claim 7, and further comprising the step of modeling the network as a map on a graphical user interface.

10. A method according to claim 7, and further comprising the step of establishing a class hierarchy to define components of the network vulnerability analysis programs that share common data and programming traits.

11. A method according to claim 7, and further comprising the step of correlating the data results of the network vulnerability analysis programs using fuzzy logic processing.

12. A method according to claim 7, and further comprising the step of running the network vulnerability analysis programs to obtain data results pertaining to network system details, network topologies, node level vulnerabilities and network level vulnerabilities.

13. A computer program that resides on a medium that can be read by a program, wherein the computer program comprises instructions to cause a computer to create a system object model database representing a network, wherein the system object model database supports the information data requirements of separate, non-integrated disparate network vulnerability analysis programs that analyze discrete network portions, wherein each analysis program is operative to run as a separate program and produce an initial data source separate from any data sources produced by respective other programs also running to produce a plurality of initial data sources for creating the system object model database;

export the system object model database of the network to the network vulnerability analysis programs;

analyze the network with each network vulnerability/risk analysis program to produce data results from each program; and correlate the data results of the network vulnerability analysis programs to determine the security posture of the network.

14. A computer program according to claim 13, and further comprising instructions for displaying an integrated application programming interface, and exporting the system object model database to the network vulnerability analysis programs via the integrated application programming interface.

15. A computer program according to claim 13, and further comprising instructions for modeling the network as a map on a graphical user interface.

16. A computer program according to claim 13, and further comprising instructions for establishing a class hierarchy to define components of the network vulnerability analysis programs that share common data and programming traits.

17. A computer program according to claim 13, and further comprising instructions for correlating the data results of the network vulnerability analysis programs using fuzzy logic processing.

18. A computer program according to claim 13, and further comprising instructions for running the network vulnerability analysis programs to obtain data results that pertain to network system details, network topologies, node level vulnerabilities and network level vulnerabilities.

19. A computer program that resides on a medium that can be read by a program, wherein the computer program comprises instructions to cause a computer to create a system object model database representing a network, wherein the system object model database supports the information data requirements of separate, non-integrated network vulnerability analysis programs that analyze discrete network portions, wherein each analysis program is operative to run as a separate program and produce an initial data source separate from any data sources produced by respective other programs also running to produce a plurality of initial data sources for creating the system object model database;

import the system object model database of the network to the network vulnerability analysis programs through filters associated with each respective network vulnerability analysis program so as to export only the data required by the respective network vulnerability analysis program;

analyze the network with each network vulnerability analysis program to produce data results from each program; and correlate the data results of the network vulnerability analysis programs to determine the security posture of the network.

20. A computer program according to claim 19, and further comprising instructions for displaying an integrated application programming interface, and exporting the system object model database to the network vulnerability analysis programs via the integrated application programming interface.

21. A computer program according to claim 19, and further comprising instructions for modeling the network as a map on a graphical user interface.

22. A computer program according to claim 19, and further comprising instructions for establishing a class hierarchy to define components of the network vulnerability analysis programs that share common data and programming traits.

23. A computer program according to claim 19, and further comprising instructions for correlating the data results of the disparate network vulnerability analysis programs using fuzzy logic processing.

24. A computer program according to claim 19, and further comprising instructions for running the network vulnerability analysis programs to obtain data results that pertain to network system details, network topologies, node level vulnerabilities and network level vulnerabilities.

25. A data processing system for assessing the security vulnerability of a network comprising:

a plurality of separate, non-integrated network vulnerability/risk analysis programs used for analyzing a network;

a system object model database that represents the network to be analyzed, wherein the system object model database supports the information data requirements of the network vulnerability/risk analysis programs, wherein each analysis program is operative to run as a separate program and produce an initial data source separate from any data sources produced by respective other programs also running to produce a plurality of initial data sources for creating the system object model database;

an applications programming interface for exporting the system object model database of the network to the network vulnerability/risk analysis programs; and a processor for correlating the data results obtained from each network vulnerability analysis program after analyzing the network to determine the security posture of the network.

26. A data processing system according to claim 25, wherein the applications programming interface for importing the system object model database comprises a graphical user interface.

27. A data processing system according to claim 25, and further comprising a graphical user interface that models the network as a map.

28. A data processing system according to claim 25, and further comprising a graphical user interface for displaying the security posture of the network.

29. A data processing system according to claim 25, wherein said database further comprises an object oriented class hierarchy to define components of the network vulnerability analysis programs that share common data and programming traits.

30. A data processing system according to claim 25, wherein said processor comprises a fuzzy logic processor.

31. A data processing system for assessing the security vulnerability of a network comprising:

a plurality of separate, non-integrated network vulnerability/risk analysis programs used for analyzing a network;

a system object model database that represents the network to be analyzed, wherein the system object model database supports the information data requirements of each network vulnerability analysis program, wherein each analysis program is operative to run as a separate program and produce an initial data source separate from any data sources produced by respective other programs also running to produce a plurality of initial data sources for creating the system object model database;

an applications programming interface for exporting the system object model database of the network to the separate, non-integrated network vulnerability analysis programs;

a filter associated with the applications programming interface and each respective network vulnerability analysis program for filtering the system object model database and exporting only the required data requirements to each network vulnerability analysis program; and a processor for correlating the data results obtained from each network vulnerability analysis program after analyzing the network to determine the security posture of the network.

32. A data processing system according to claim 31, wherein the applications programming interface for importing the system object model database to comprises a graphical user interface.

33. A data processing system according to claim 31, and further comprising a graphical user interface that models the network as a map.

34. A data processing system according to claim 31, and further comprising a graphical user interface for displaying the vulnerability posture of the network.

35. A data processing system according to claim 31, wherein said database further comprises an object oriented class hierarchy to define components of the network vulnerability analysis programs that share common data and programming traits.

36. A data processing system according to claim 31, wherein said processor comprises a fuzzy logic processor.

* * * * *